US009063958B2

(12) United States Patent
Müller et al.

(10) Patent No.: US 9,063,958 B2
(45) Date of Patent: Jun. 23, 2015

(54) ADVANCE ENHANCEMENT OF SECONDARY PERSISTENCY FOR EXTENSION FIELD SEARCH

(75) Inventors: Martin Müller, Walldorf (DE); Thilo Böhm, Heidelberg (DE); Uwe Schlarb, Ostringen (DE); Maic Wintel, Walldorf (DE)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 12/845,910

(22) Filed: Jul. 29, 2010

(65) Prior Publication Data

US 2012/0030225 A1     Feb. 2, 2012

(51) Int. Cl.
*G06F 7/00*     (2006.01)
*G06F 17/30*     (2006.01)

(52) U.S. Cl.
CPC .... *G06F 17/30289* (2013.01); *G06F 17/30451* (2013.01)

(58) Field of Classification Search
CPC ................................................ G06F 17/30451
USPC .................................. 707/607, 608, 687, 752
See application file for complete search history.

(56) References Cited

U.S. PATENT DOCUMENTS

| | | | |
|---|---|---|---|
| 6,631,522 B1 * | 10/2003 | Erdelyi | ............................ 725/53 |
| 7,213,018 B2 * | 5/2007 | Rowley | ........................ 707/754 |
| 7,318,066 B2 | 1/2008 | Kaufman et al. | |
| 7,536,411 B2 * | 5/2009 | Rowley | ................................. 1/1 |
| 8,103,668 B2 * | 1/2012 | Cheng et al. | ................... 707/733 |
| 8,468,154 B2 * | 6/2013 | Leino et al. | ..................... 707/724 |
| 2003/0093415 A1 * | 5/2003 | Larson et al. | ...................... 707/3 |
| 2005/0021536 A1 | 1/2005 | Fiedler et al. | |
| 2005/0050537 A1 * | 3/2005 | Thompson et al. | ........... 717/165 |
| 2005/0172261 A1 | 8/2005 | Yuknewicz et al. | |
| 2005/0183002 A1 | 8/2005 | Chapus | |
| 2005/0193039 A1 | 9/2005 | Adiba et al. | |
| 2005/0229186 A1 | 10/2005 | Mitchell et al. | |
| 2006/0101091 A1 | 5/2006 | Carbajales et al. | |
| 2006/0136452 A1 * | 6/2006 | Lim et al. | ...................... 707/101 |
| 2006/0206507 A1 | 9/2006 | Dahbour | |
| 2006/0212496 A1 | 9/2006 | Romine et al. | |
| 2006/0225032 A1 | 10/2006 | Klerk et al. | |
| 2006/0230066 A1 | 10/2006 | Kosov et al. | |

(Continued)

FOREIGN PATENT DOCUMENTS

| | | |
|---|---|---|
| EP | 1 494 131 A1 | 1/2005 |
| WO | 2005/098593 A2 | 10/2005 |

OTHER PUBLICATIONS

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

(Continued)

*Primary Examiner* — Hosain Alam
*Assistant Examiner* — Eliyah S Harper
(74) *Attorney, Agent, or Firm* — Buckley, Maschoff & Talwalkar LLC

(57) ABSTRACT

Some aspects include reception of an indication of an extension field added to a node of a business object object model, and modification of a schema of a search engine index based on the extension field and before receiving an instruction to add the extension field to a search view.

21 Claims, 7 Drawing Sheets

(56) References Cited

U.S. PATENT DOCUMENTS

| | | | |
|---|---|---|---|
| 2006/0282411 A1* | 12/2006 | Fagin et al. | 707/3 |
| 2006/0294141 A1 | 12/2006 | Tsang et al. | |
| 2007/0073744 A1* | 3/2007 | McVeigh et al. | 707/100 |
| 2007/0088716 A1 | 4/2007 | Brumme et al. | |
| 2007/0239711 A1 | 10/2007 | Unnebrink et al. | |
| 2008/0005623 A1 | 1/2008 | Said | |
| 2008/0027893 A1* | 1/2008 | Cavestro et al. | 707/1 |
| 2008/0109436 A1 | 5/2008 | Klein et al. | |
| 2008/0109496 A1 | 5/2008 | Holenstein et al. | |
| 2008/0115082 A1* | 5/2008 | Simmons et al. | 715/804 |
| 2008/0162536 A1 | 7/2008 | Becker et al. | |
| 2008/0162622 A1 | 7/2008 | Becker et al. | |
| 2008/0163253 A1 | 7/2008 | Massmann et al. | |
| 2008/0195964 A1 | 8/2008 | Randell | |
| 2008/0275844 A1 | 11/2008 | Buzsaki et al. | |
| 2008/0319942 A1 | 12/2008 | Courdy et al. | |
| 2009/0150216 A1* | 6/2009 | Milman et al. | 705/10 |
| 2010/0036840 A1* | 2/2010 | Pitts | 707/5 |
| 2010/0057504 A1 | 3/2010 | Baeuerle et al. | |
| 2010/0057771 A1 | 3/2010 | Baeuerle et al. | |
| 2010/0057776 A1 | 3/2010 | Baeuerle et al. | |
| 2010/0161648 A1 | 6/2010 | Eberlein et al. | |
| 2010/0162147 A1 | 6/2010 | Ritter et al. | |
| 2012/0023130 A1 | 1/2012 | Schlarb et al. | |

OTHER PUBLICATIONS

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

Joseph W. Yoder et al., "Architecture and Design of Adaptive Object-Models", ACM SIGPLAN Notices, XP-002249967, vol. 36, No. 12, Dec. 2001, (pp. 50-60, 11 pages total).

Martin Mueller et al., U.S. Appl. No. 12/195,111, entitled "Fast Search Replication Synochronization Processes", filed Nov. 24, 2009.

"European Search Report", dated Nov. 6, 2009, for European Application No. 09009931.8, 3pgs.

* cited by examiner

ADVANCE ENHANCEMENT OF SECONDARY PERSISTENCY FOR EXTENSION FIELD SEARCH

Some embodiments relate to business objects within a business process platform. More specifically, some embodiments relate to indexed searching of business object node extension fields provided by a business process platform.

BACKGROUND

An application platform may implement business objects to support different business solutions. A business object, for example, is a software model representing real-world items used during the transaction of business. A business object may comprise a SalesOrder object model or an Organization object model. Instances of these object models, in turn, represent specific data (e.g., SalesOrder SO435539, ACME corporation).

A business object may specify business logic and/or data having any suitable structure. The structure may be determined based on the requirements of a business scenario in which the instance is to be deployed. A business application for a particular business scenario may require many business object instances, where the structure of each has been determined based on the requirements of the particular business scenario.

A customer deploying a business solution may desire changes to a business object included in the business solution. For example, a customer may require a field (e.g., SerialNumber) which does not exist within the Product business object of a business solution. In addition, another customer may require an additional node or query within the Product business object of the same business solution.

Some conventional application platforms support the addition of extension fields to nodes of existing business objects. Consequently, these application platforms are able to store data associated with instances of these extension fields (e.g., Ser. No. 27/44,234) in a primary persistency (e.g., a relational database, flat files). This data can then be consumed by user interfaces, queries and other entities supported by the application platforms.

Known application platforms support indexed searching of business object data. Generally, these platforms replicate the business data within a secondary persistence. The data within the secondary persistence is indexed according to an index schema, and may be accessed via developer-created views on business object nodes. Views describe a search structure, result structure and semantically-relevant relationships (joins) between the involved nodes.

The application platform maintains synchronization between the primary persistency and the secondary persistency during operation. For example, an enterprise service manager may call an agent when saving business object data to the primary persistency. The agent then indexes the data directly into the secondary persistency.

It is often desirable to modify a view to include a newly-added extension field. This task presents difficulties. First, modification of a view to include a newly-added extension field relies of the existence of metadata (e.g., field type descriptions) describing the extension field. In this regard, addition of the extension field to the application platform results in the creation of associated metadata in a metadata repository of the application platform. The addition does not, however, result in generation of the metadata required for view modification.

Also, in order to add an extension field to a view, conventional systems require execution of an "initial load" into the secondary persistency. During an initial load, all data of all nodes within the primary persistence are retrieved, the index schema is rebuilt based on the data, and the data are stored in the secondary persistence according to the index schema. During execution of the initial load, no views or queries of the secondary persistency are able to return reliable data.

Moreover, data associated with an instance of the extension field can be produced and saved in a primary persistency after creation of the extension field. As described above, such saving may cause an enterprise service manager to call an agent so that the data of the associated business object instance may be synchronized with the secondary persistency. However, if no view on the extension field has been created, the schema of the secondary persistency is unaware of the extension field, and the data of the extension field is therefore not indexed within the secondary persistency.

Systems are desired to facilitate building of views on an added extension field without requiring an intervening initial load. Also desired is the ability to index data associated with an added extension field regardless of whether or not a view on the extension field exists.

DETAILED DESCRIPTION

An application platform provider may create a number of standard business object searches that are likely to be of interest to various enterprises. For example, the provider might create business object searches associated with customer relationship management processes, supply chain information, human resources records, and/or financial data. The business object searches are intended to provide business data stored by the application platform.

The business data may be stored within physical tables of a database. The database may comprise a relational database such as SAP MaxDB, Oracle, Microsoft SQL Server, IBM DB2, Teradata and the like. Alternatively, the database could be a multi-dimensional database, an eXtendable Markup Language (XML) document, or any other structured data storage system. The physical tables may be distributed among several relational databases, dimensional databases, and/or other data sources.

Figure 1:
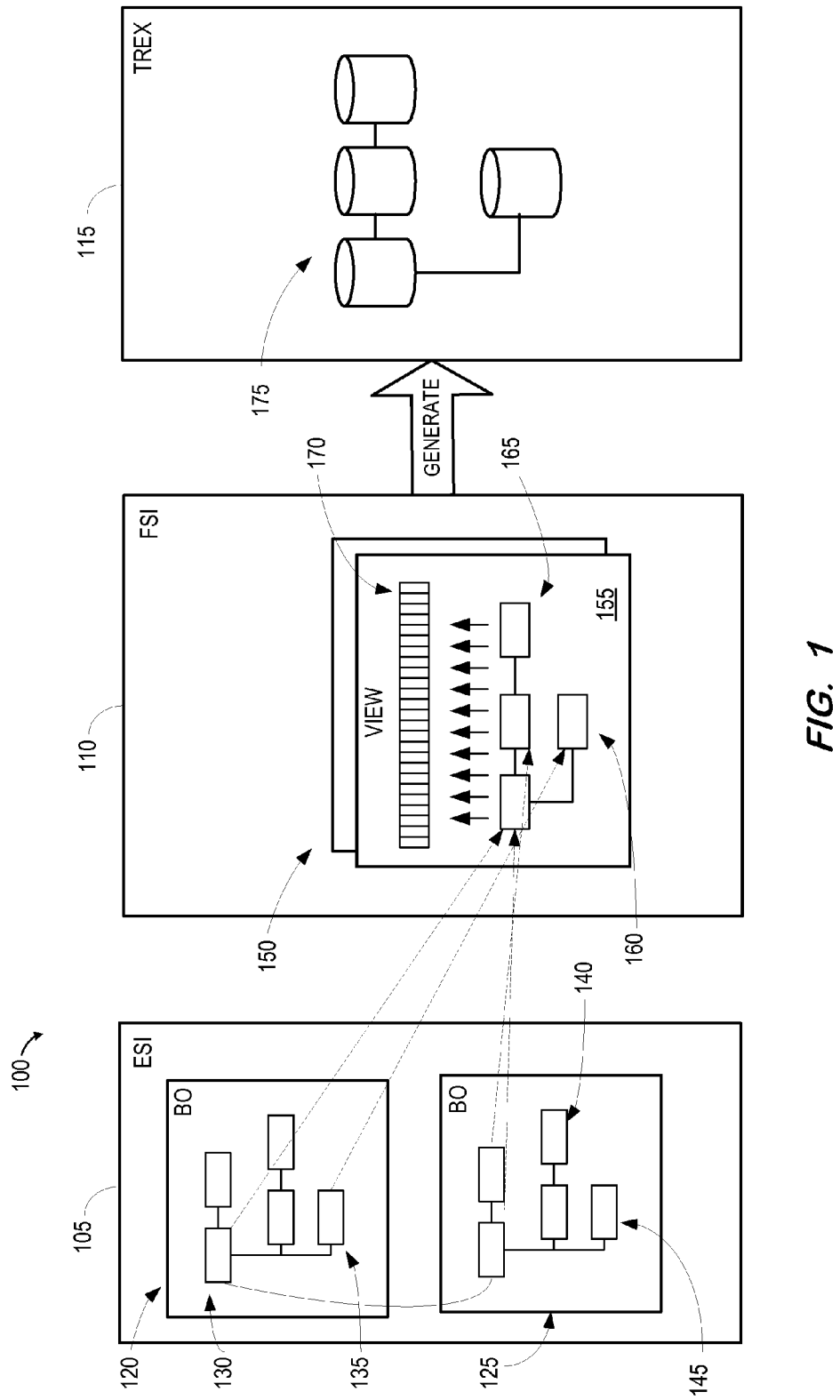
FIG. 1 is a block diagram of a system.

FIG. 1 is a block diagram of system 100 according to some embodiments. FIG. 1 represents a logical architecture for describing some embodiments, and actual implementations may include more or different components arranged in any manner. System 100 may be implemented using any number of computer devices, and one or more processors may execute program code to perform processes described herein. Object models and object model instances may be embodied in any types of electronic data structures.

System 100 includes Enterprise Service Infrastructure (ESI) 105 and Fast Search Infrastructure (FSI) 110. In some embodiments, ESI 105 and FSI 110 may form or be a part of an application server. FSI 110 may interface with a search engine 115 such as, for example, the TREX® search engine depicted in FIG. 1 which is provided by SAP AG®. Business objects, such as business objects 120 and 125, including their nodes (e.g., 130, 135, 140, 145) and services (e.g., query services, not shown) may be modeled and may include any suitable data structure. The business objects may be defined within ESI 105, wherein the definition for each business object may include business object nodes (e.g., 130, 135) and various services belonging to the nodes.

A view may be defined as a set of attributes that are linked to corresponding business object attributes of different business object nodes, and which are connected to each other by database joins. In some cases, a view may be associated with a single business object. The attributes of the view may represent the registry of the underlying business object attributes. The underlying business object attributes may be used, for example, to selectively index or replicate business object data. In operation at runtime, a view may be used, for example in connection with a search engine, to execute query calls against generated indices based on the join conditions specified and defined by a view. Since the corresponding indices are structured according to the defined BO model structures, the query (or other service) may be executed without any structural or data transformations.

FIG. 1 illustrates views 150 created and defined within FSI 110. The views may specify joins over different nodes. As illustrated, two nodes from business object 120 and two nodes from business object 125 are used to construct and define view 155 in FSI 110. The "lines" linking the nodes selected and included in the view are graphical representations of a database join (e.g., inner joins or left outer joins). Thus, the data structure of a view may contain a select number of attributes of different business objects, as determined and represented by the selected and corresponding nodes included in the view. In this manner, a view may contain a set of attributes in a pre-defined manner across different nodes, including desired or select attributes of the corresponding nodes.

In some embodiments, the attributes of the joined nodes comprising the view (i.e., view fields 170) are exposed to external processes and services. The actual data sources related to the nodes of the view may be hidden from external or outside processes such that view fields 170 of view 155 may be the only exposed and visible components of the view. This aspect may allow only desired or relevant attributes associated with a business object to be observed, as defined by the view.

As described in the Background, view attributes may be replicated in a secondary persistency. This replication may comprise storing the view attributes in persisted indices. FIG. 1 shows indices 175 associated with an application, function, or service such as, for example, a search engine (e.g., TREX search engine 115) and/or another data structure such as a database shadow table (not shown). Each index 175 may store data associated with the attributes (or fields) of only one business object node.

Data replication may be based on metadata defining FSI views 150. The metadata describes the nodes comprising the views that are to be replicated to indices 175. TREX search engine 115 and/or other applications, functions, and services may use the indexed nodes to execute queries and/or other processes.

Figure 2:
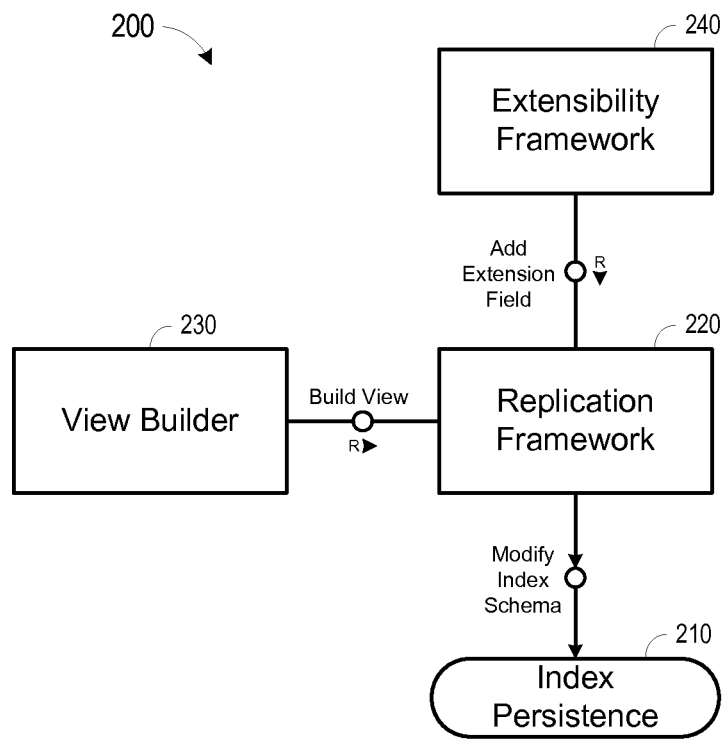
FIG. 2 is a block diagram of a system according to some embodiments.

FIG. 2 illustrates system 200 according to some embodiments. Index persistence 210 may comprise one or more search engine indices such as indicies 175. Each index may index data associated with a respective node of a business object. Index persistence 210 is associated with a schema that governs the arrangement and storage of data therein.

Replication framework 220 controls the replication of primary persistence data (not shown) into index persistence 210. The replication is based on replication structures stored therein. Details of replication framework 220 and the replication structures according to some embodiments will be provided below.

Replication framework 220 also supports view builder 230. More specifically, replication framework 220 may provide metadata to view builder 230 based on which a developer/partner/customer may modify or create search views. Each search view is associated with one or more business object node attributes. According to some embodiments, view builder 230 is used to add an extension field of a business object node to a search view. By adding the field to a search view, system 200 may store data associated with instances of the extension field in index persistence 210.

Extensibility framework 240 may comprise any system or tool which may detect the addition of an extension field to a business object node. Extensibility framework 240 may comprise a system to add such an extension field to a business object node, but embodiments are not limited thereto. In the context of the present description, extensibility framework 240 is to transmit an indication of an extension field which has been added to a business object node.

Figure 3:
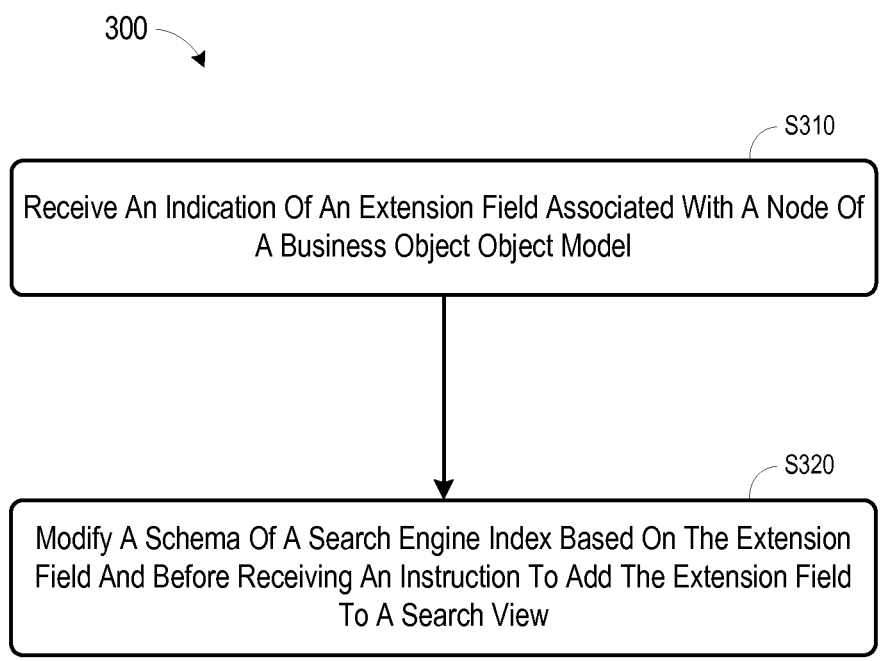
FIG. 3 is a flow diagram of a process according to some embodiments.

FIG. 3 is a flow diagram of process 300 which may be performed by elements of system 200 according to some embodiments. In this regard, all processes described herein may be executed by any combination of hardware and/or software. The processes may be embodied in program code stored on a tangible medium and executable by a computer processor to provide the functions described herein.

Initially, at S310, an indication of a field extension associated with a node of a business object object model is received. In one example, replication framework 220 exposes an interface for receiving an instruction to add an extension field, and extensibility framework 240 calls this interface at S310 along with the name of the extension field. Details of such an interface according to some embodiments are provided below.

Next, at S320, a schema of a search engine index is modified based on the extension field. Advantageously, and in contrast to existing systems, the schema is modified before an instruction to add the extension field to a search view is received. For example, replication framework 220 may modify the schema of index persistence 210 at S320 based on the added extension field, and this modification occurs before view builder 230 builds a search view including the extension field.

As a result of process 300, an extension field may be added to an existing search view without requiring execution of an initial load after the extension field is added to its business object node. In addition to conserving system resources, this feature reduces system downtime because views are not determinate during an initial load and should therefore not be accessed until the initial load is complete. According to some embodiments, S320 also includes updating metadata of replication framework 220 which is required by view builder 230 to include the extension field in the view. That is, the metadata is updated before the instruction to update the view is received.

In some embodiments, S320 occurs before receiving data of an instance of the extension field for storage in the secondary persistency. Therefore, the schema of index persistency 210 is prepared to store the data once such data is received. Some embodiments modify replication structures of framework 220 at S320 to facilitate the replication of this data in the secondary persistency.

Figure 4:
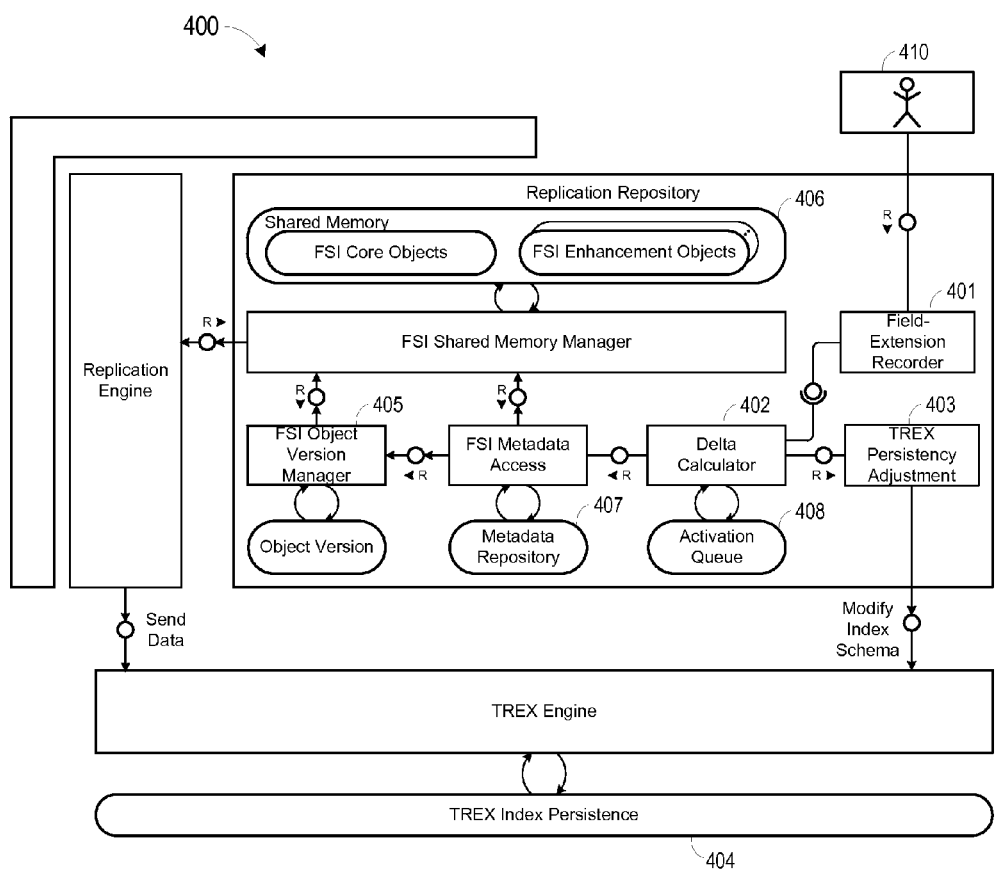
FIG. 4 is a detailed block diagram of a system according to some embodiments.

FIG. 4 is a detailed block diagram of replication framework 400 according to some embodiments. Replication framework 400 may comprise an implementation of replication framework 220 of system 200, but embodiments are not limited thereto. In this regard, replication framework 400 may execute process 300 of FIG. 3.

Element 410 of FIG. 4 may comprise extensibility framework 240 of system 200. Element 410 may comprise any system or component for transmitting an indication of an extension field added to a business object node. As described above, element 410 may transmit such an indication by calling an interface exposed by replication framework 400.

Field extension recorder 401 provides this interface according to some embodiments. The interface may allow element 410 to pass type descriptions for newly-added extension fields. According to some embodiments, the interface comprises IF_FSI_ACTIVATION_FLEXIBILITY~ADD_EXTENSION_FIELD as described below:

Field recorder 401 passes the received information to delta calculator 402. Delta calculator 402 calculates all deltas between the current index schema and the target index schema (i.e., an index schema which reflects the newly-added extension field). If a delta is calculated (i.e., the delta is not zero), TREX persistency adjustment 403 modifies the current schema to create the target schema. As a result, system 400 is ready to index data of the newly-added extension field into secondary persistency 404 without requiring an initial load. Also, whenever a new enhancement of a corresponding search view is generated, the search will already include data from the extension fields even if an initial load has not been performed since the extension field was added.

Delta calculator 402 also notifies object version manager 405 if a delta is calculated. Object version manager 405 then writes a new version of corresponding replication structures to shared memory 406. All successive accesses to the enhanced replication structure via shared memory 406 will see the new version, which triggers a rebuild of the tenant-specific area of shared memory 406.

Figure 5:
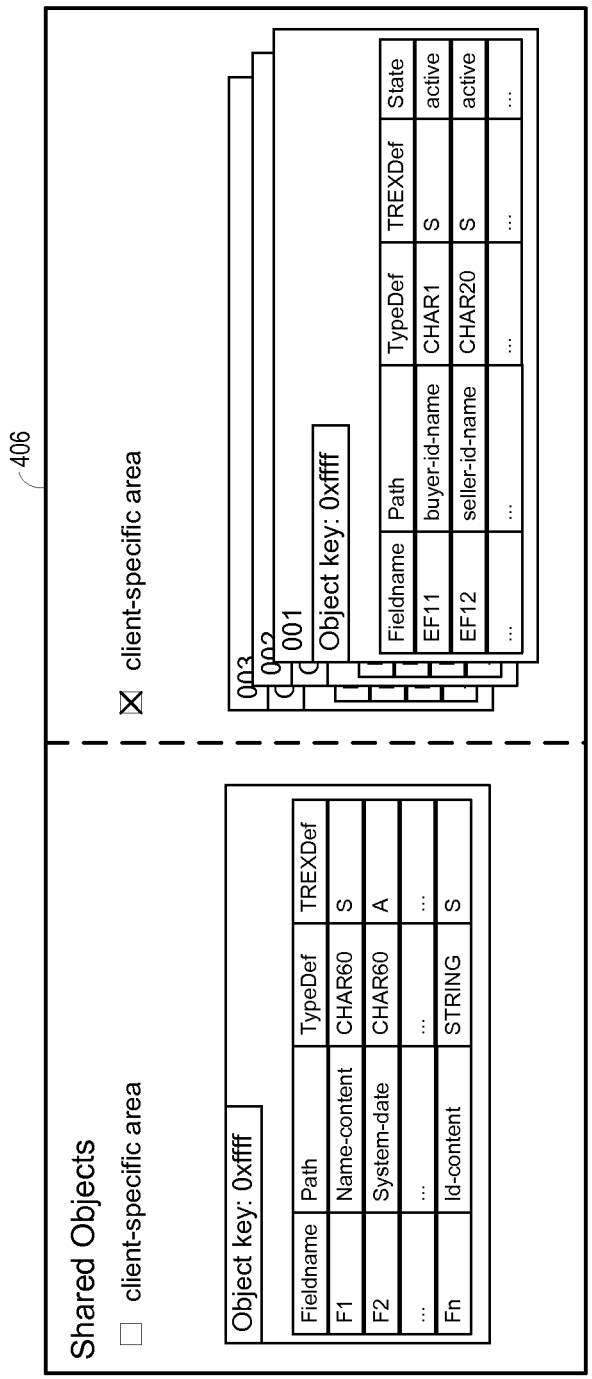
FIG. 5 illustrates objects in shared memory according to some embodiments.

FIG. 5 illustrates shared memory 406 according to some embodiments. In a multi-tenant environment, each tenant may be associated with its own enhancements. Therefore, for fast runtime access, replication structures are created which correspond to a respective business object node. These structures are stored as shared objects and used for indexing into a secondary persistency.

| IF_FSI_ACTIVATION_FLEXIBILITY~ADD_EXTENSION_FIELD | | | |
|---|---|---|---|
| IN_BO_NAME | Importing | Type | STRING |
| IN_BO_NODE_NAME | Importing | Type | STRING |
| IN_FIELD_PATH | Importing | Type | STRING |
| IN_EXTENSION_DESCRIPTION | Importing | Type | TY_EXTENSION_DESCRIPTION | where:
IN_BO_NAME: Name of business object to which the extension field has been added.
IN_BO_NODE_NAME: Name of business object node to which the extension field has been added.
IN_FIELD_PATH: The path of the extension field in the notation AA-BBB-CC.
IN_EXTENSION_DESCRIPTION: More detailed description of the extension field of type TY_EXTENSION_DESCRIPTION as shown below:

As shown in FIG. 5, the shared object is split into a tenant-specific area and a tenant-independent area. A core object may be provided by an application platform developer and placed in the tenant-independent area whereas enhancements are stored in the tenant-dependent area. Each replication structure includes core parts derived from developer-provided search views. Replication structures based on developer-provided extensions may also be represented in the core object.

| IF_FSI_ACTIVATION_FLEXIBILITY~TY EXTENSION DESCRIPTION | | |
|---|---|---|
| TYPE_DESCRIPTION | TYPE | SFSG_TYPE_DESCRIPTION |
| REPRESENTATION_TERM | TYPE | STRING |
| TRANSFORMATION_DIRECTIVES | TYPE | TT_TRANSFORMATION_DIRECTIVES |
| DEPENDENT_OBJECT_INFO | TYPE | TY_DEPENDENT_OBJECT |

The interface provided by field extension recorder 401 may also comprise IF_FSI_ACTIVATION_FLEXIBILITY~REMOVE_EXTENSION_FIELD as described below:

| IF_FSI_ACTIVATION_FLEXIBILITY~REMOVE_EXTENSION_FIELD | | | |
|---|---|---|---|
| IN_BO_NAME | Importing | Type | STRING |
| IN_BO_NODE_NAME | Importing | Type | STRING |
| IN_FIELD_PATH | Importing | Type | STRING |

When a shared object is changed, version manager 405 is informed and writes a new object version. All accesses to shared memory 406 will therefore return consistent and current data.

Figure 6:
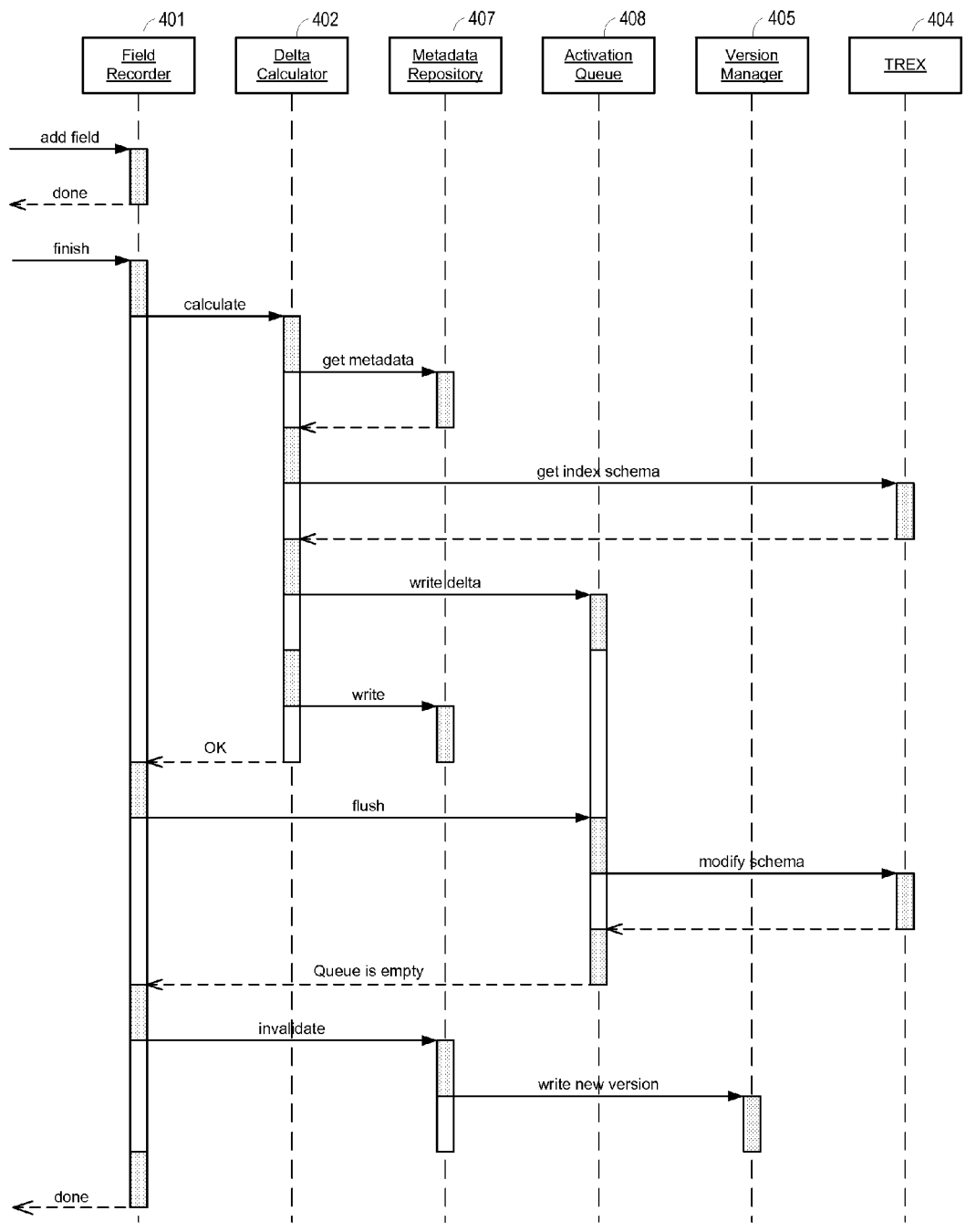
FIG. 6 is a sequence diagram according to some embodiments.

FIG. 6 illustrates sequence diagram 600 according to some embodiments. Sequence diagram 600 illustrates coordination of actions of the elements of framework 400 as described above. Sequence diagram 600 may comprise an implementation of process 300 in some embodiments.

Initially, field recorder 401 receives an indication of an extension field added to a node of a business object. The indication may comprise a call to the above-mentioned interface IF_FSI_ACTIVATION_FLEXIBILITY~ADD_EXTENSION_FIELD. Specifically, the call sequence in some embodiments may proceed as follows:

```
IF_FSI_ACTIVATION_FLEXIBILITY =
CL_FSI_ACTIVATION_FIELD_C=>GET_INSTANCE( ).
* === add extension fields
IF_FSI_ACTIVATION_FLEXIBILITY~
ADD_EXTENSION_FIELD( . . . )
[ . . .]
* === finish the action
CL_FSI_ACTIVATION_FIELD_C=>FINISH( )
```

Delta calculator 402 is then instructed to calculate a schema delta based on the added extension field. To do so, delta calculator 402 retrieves metadata from metadata repository 407 which describes the current replication structures. Delta calculator 402 also retrieves the current index schema from index persistence (e.g., TREX 404).

Delta calculator 402 calculates the delta and writes the delta to activation queue 408. Delta calculator 402 also writes new metadata to metadata repository 407 and returns an "OK" to field recorder 401.

Field recorder 401 then instructs activation queue 408 to flush the newly-calculated delta to persistence 404. Activation queue 408 therefore modifies the index schema of persistence 404 based on the delta. Some embodiments support more than one delta calculation, so activation queue 408 may successively modify the index based on several delta calculations.

After modification of the index schema, field recorder 401 invalidates the prior metadata in metadata repository 407. This action causes metadata repository 407 to write a new metadata version to version manager 405. As mentioned above, version manager 405 instantiates new objects in shared memory 406 based on the new metadata. Search views may then be modified based on the new objects.

Figure 7:
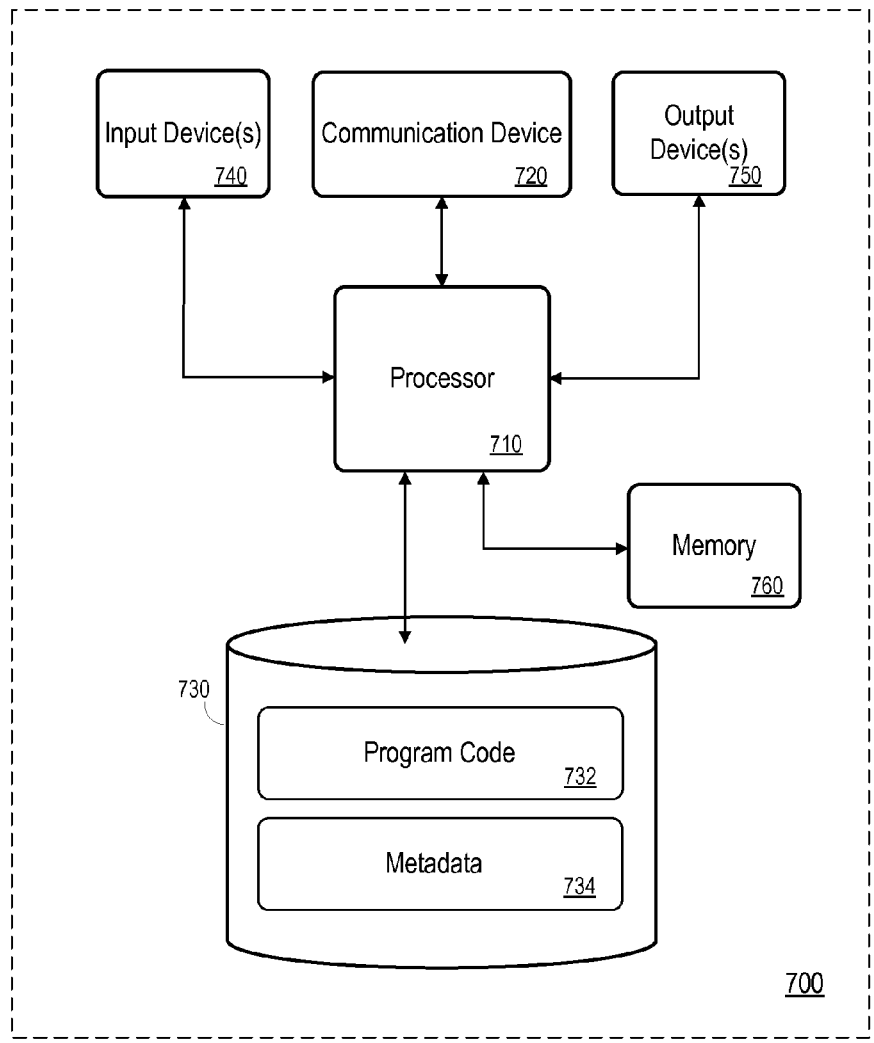
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of system 400. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as an external design tool. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code 732 may be executed by processor 710 to cause apparatus 700 to perform any one or more of the processes described herein. Embodiments are not limited to execution of these processes by a single apparatus. Metadata 734 may include metadata defining search views, replication structures, and/or index schemas. Data storage device 730 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computer in response to execution of program code by a processor of said computer, comprising:
   generating a schema of a search engine index based on one or more search views, each of the one or more search views comprising at least one attribute of at least one node of one or more business objects;
   receiving an indication of an extension field added to one of the at least one nodes after generation of the schema; and
   adding the extension field to the schema of the search engine index before receiving an instruction to add the extension field to a search view;
   wherein the adding the extension field to the schema of the search engine index before receiving an instruction to add the extension field to a search view comprises:
      adding the extension field to the schema of the search engine index without re-generating the schema of the search engine index based on the one or more search views.

2. A method according to claim 1, wherein adding the extension field to the schema of the search engine index comprises:
   adding the extension field to the schema of the search engine index before receiving data of an instance of the extension field to store in the search engine index.

3. A method according to claim 1, wherein adding the extension field to the schema of the search engine index comprises:
   determining a difference between the schema and a target schema of the search engine index based on the extension field; and
   modifying the schema of the search engine index to the target schema based on the difference.

4. A method according to claim 1, further comprising:
generating a new replication structure based on the extension field and before receiving an instruction to add the extension field to a search view.

5. A method according to claim 4, wherein generating the new replication structure comprises:
generating the new replication structure before receiving data of an instance of the extension field to store in the search engine index.

6. A method according to claim 4, further comprising writing the new replication structure to a cache memory before receiving an instruction to add the extension field to a search view.

7. A method according to claim 6, wherein the replication structure includes tenant-independent replication metadata and tenant-specific replication metadata corresponding to two or more tenants, and wherein the cache memory is shared among the two or more tenants.

8. A non-transitory computer-readable medium having stored thereon program code, the program code executable by a computer to:
generate a schema of a search engine index based on one or more search views, each of the one or more search views comprising at least one attribute of at least one node of one or more business objects;
receive an indication of an extension field added to one of the at least one nodes after generation of the schema; and
adding the extension field to the schema of the search engine index before receiving an instruction to add the extension field to a search view;
wherein the adding the extension field to the schema of the search engine index before receiving an instruction to add the extension field to a search view comprises:
adding the extension field to the schema of the search engine index without re-generating the schema of the search engine index based on the one or more search views.

9. A medium according to claim 8, wherein the program code executable by a computer to add the extension field to the schema of the search engine index comprises program code executable by a computer to:
add the extension field to the schema of the search engine index before receipt of data of an instance of the extension field to store in the search engine index.

10. A medium according to claim 8, wherein the program code executable by a computer to add the extension field to the schema of the search engine index comprises program code executable by a computer to:
determine a difference between the schema and a target schema of the search engine index based on the extension field; and
modify the schema of the search engine index to the target schema based on the difference.

11. A medium according to claim 8, the program code further executable by a computer to:
generate a new replication structure based on the extension field and before receiving an instruction to add the extension field to a search view.

12. A medium according to claim 11, wherein the program code executable by a computer to generate the new replication structure comprises program code executable by a computer to:
generate the new replication structure before receiving data of an instance of the extension field to store in the search engine index.

13. A medium according to claim 11, the program code further executable by a computer to:
write the new replication structure to a cache memory before receiving an instruction to add the extension field to a search view.

14. A medium according to claim 13, wherein the replication structure includes tenant-independent replication metadata and tenant-specific replication metadata corresponding to two or more tenants, and wherein the cache memory is shared among the two or more tenants.

15. A computer-implemented system comprising:
a search infrastructure to generate a schema of a search engine index based on one or more search views, each of the one or more search views comprising at least one attribute of at least one node of one or more business objects;
an extensibility framework to transmit an indication of an extension field added to one of the at least one nodes after generation of the schema; and
a replication framework to:
receive the indication from the extensibility framework; and
add the extension field to the schema of the search engine index before receipt of an instruction to add the extension field to a search view;
wherein the add the extension field to the schema of the search engine index before receipt of an instruction to add the extension field to a search view comprises:
adding the extension field to the schema of the search engine index without re-generating the schema of the search engine index based on the one or more search views.

16. A system according to claim 15, wherein addition of the extension field to the schema of the search engine index comprises:
addition of the extension field to the schema of the search engine index before receipt of data of an instance of the extension field to store in the search engine index.

17. A system according to claim 15, wherein addition of the extension field to the schema of the search engine index comprises:
determination of a difference between the schema and a target schema of the search engine index based on the extension field; and
modification of the schema of the search engine index to the target schema based on the difference.

18. A system according to claim 15, further comprising:
a view builder to issue the instruction to add the extension field to the search view.

19. A system according to claim 18,
a cache memory,
wherein the replication framework is to generate a new replication structure based on the extension field and to write the new replication structure to the cache memory before receiving an instruction to add the extension field to the search view.

20. A system according to claim 19, wherein the replication structure includes tenant-independent replication metadata and tenant-specific replication metadata corresponding to two or more tenants, and wherein the cache memory is shared among the two or more tenants.

21. A method according to claim 1, wherein the adding the extension field to the schema of the search engine index before receiving an instruction to add the extension field to a search view comprises:
after receiving the indication of the extension field that was added to the one of the at least one nodes after generation of the schema of the search engine index, adding, to the schema of the search engine index, the extension field that was added to the one of the at least one nodes after generation of the schema of the search engine index.

* * * * *